Figure 1:
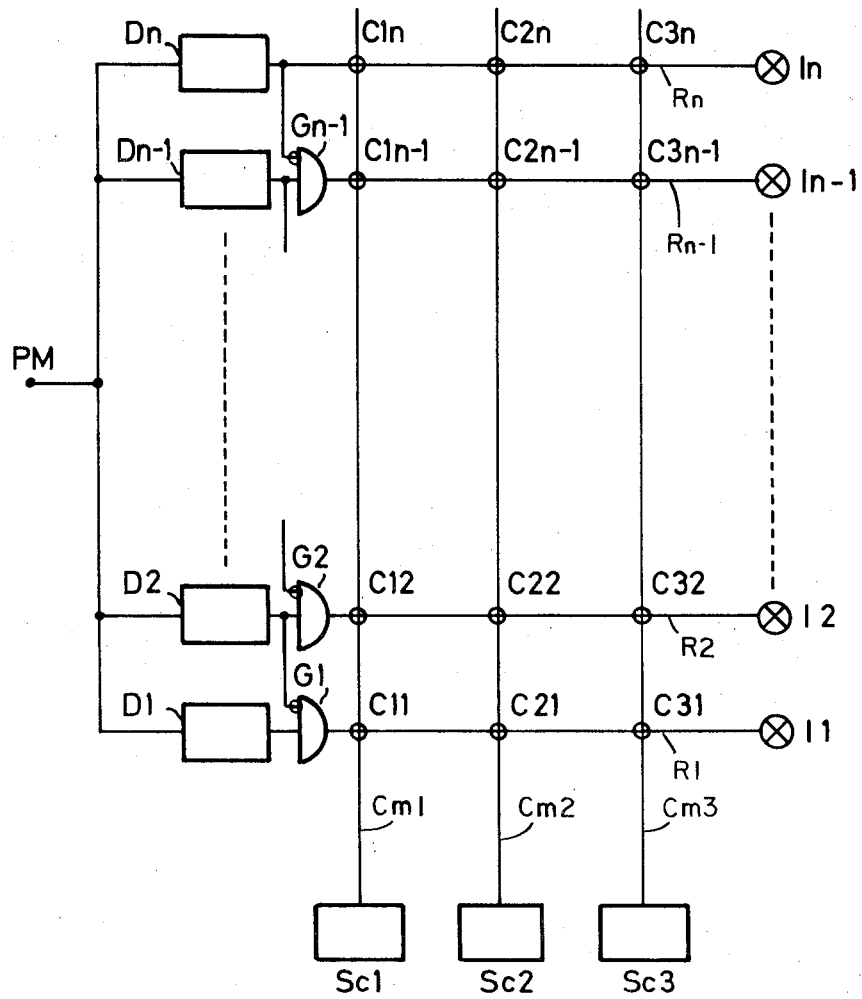

United States Patent [19]

Soini

[11] 3,772,515

[45] Nov. 13, 1973

[54] APPARATUS FOR SPECTRAL ANALYSIS AND COUNTING OF PULSES GENERATED FROM RADIO ACTIVE DISINTEGRATIONS IN A RADIATION DETECTOR

[75] Inventor: Erkki Juhani Soini, Turku, Finland

[73] Assignee: Wallac OY, Turkulo, Finland

[22] Filed: Mar. 28, 1972

[21] Appl. No.: 238,892

[30] Foreign Application Priority Data
Apr. 16, 1971 Sweden.............................. 5005/71

[52] U.S. Cl. .............................. 250/366, 328/116
[51] Int. Cl. ............................................. G01t 1/16
[58] Field of Search................ 250/83.3 R; 328/116; 307/235

[56] References Cited
UNITED STATES PATENTS

| 2,820,896 | 1/1958 | Russell et al. | 328/116 |
| 2,685,027 | 7/1954 | Alvarez | 328/116 |
| 3,678,513 | 10/1970 | Ward | 307/235 |
| 2,593,925 | 4/1952 | Sheldon | 250/83.3 R |
| 2,776,377 | 1/1957 | Anger | 250/83.3 R |

Primary Examiner—Harold A. Dixon
Attorney—Arnold B. Christen et al.

[57] ABSTRACT

An apparatus for spectral analysis and counting of electrical pulses in an instrument for measuring radioactive disintegrations. The apparatus comprises a number of discriminators having preselected amplitude transmission ranges and optical indication means for indicating the spectral energy distribution of the pulses. Scalers are provided for counting the pulses within a number of these preselected amplitude ranges.

3 Claims, 3 Drawing Figures

APPARATUS FOR SPECTRAL ANALYSIS AND COUNTING OF PULSES GENERATED FROM RADIO ACTIVE DISINTEGRATIONS IN A RADIATION DETECTOR

The present invention refers to an apparatus for spectral analysis and counting of electrical pulses generated by radioactive disintegrations in a radiation detector.

When measuring the radiation from a sample comprising for instance a $\beta$-radiating isotope, a liquid scintillation counter could be used. The sample is dissolved in a scintillation liquid, which generates light pulses when subject to $\beta$-radiation. The dissolved sample is disposed close to one or several photomultipliers in which the light pulses give rise to electrical signals, the amplitudes of which indicate the energy of the $\beta$-radiation. A certain isotope will then give rise to an energy spectrum located between 0 and a certain characteristic maximum energy. Thus for instance tritium gives a spectrum between 0 and 18 keV, carbon 14 a spectrum between 0 and 155 keV and phosphorus 32 a spectrum below 1800 keV. When counting the pulses obtained from the photomultiplier it is important that all pulses within the characteristic energy range of the isotope are counted whereas pulses having a higher energy, for example obtained from the cosmic radiation, are suppressed.

When determining the amplitude interval within which the electrical pulses are to be counted one usually uses discriminators, the threshold values of which are adjustable by means of linear potentiometers. The threshold level will thus be a linear function of the setting of the potentiometer, which means that the relative accuracy will vary substantially within the very wide range within which the potentiometer has to operate due to the big differences between the maximum energy of different isotope (compare for instance tritium and phosphorus). The discriminators therefore have to be provided with amplitude range switches or a logarithmic amplifier connected between the output of the photomultiplier and the discriminators. These additional devices for compensating the relative sensitivity are however expensive and does not in general give a complete compensation. A further drawback involved in the above discriminators, where the threshold values are set analogously at the beginning of each series of measuring experiments, is that it is difficult to find the upper limit of the spectrum derived from the sample. As indicated above, the energy spectrum of a certain isotope comprises the range from zero to a certain maximum value. Pulses will however be obtained above this maximum value due to radiation derived from exterior radioactive sources. In order to determine the level below which the pulses are to be counted one usually uses two discriminators having adjustable threshold levels. By means of these two levels a narrow amplitude interval could be defined and by varying the threshold levels this interval could be swept through the complete amplitude range. The number of pulses per unit of time within this narrow interval is then counted as the interval is swept from zero towards higher energies and when the number of pulses does not reach a certain value the corresponding amplitude interval is considered to be the upper limit of the energy spectrum. It is realized that this method is very time consuming and gives a rather vague definition of the spectrum limit.

It is an object of the present invention provide an apparatus in which the above stated drawbacks of the threshold value adjustment are eliminated and in which one can obtain a substantially constant relative threshold level accuracy within an arbitrary amplitude range. The characteristics of the invention will appear from the claims attached to the specification.

Figure 2:
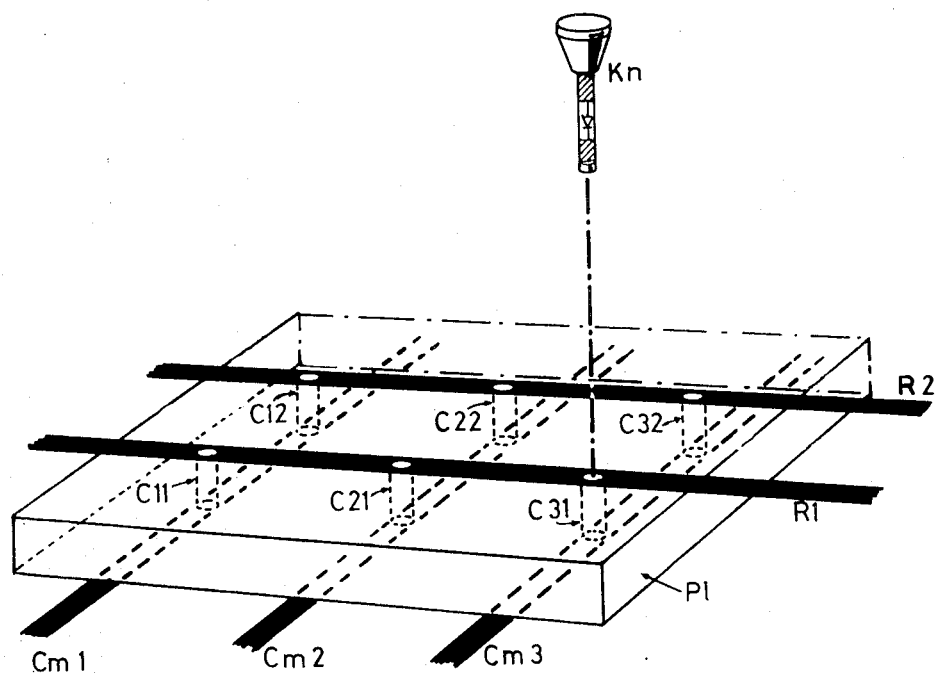
Figure 3:
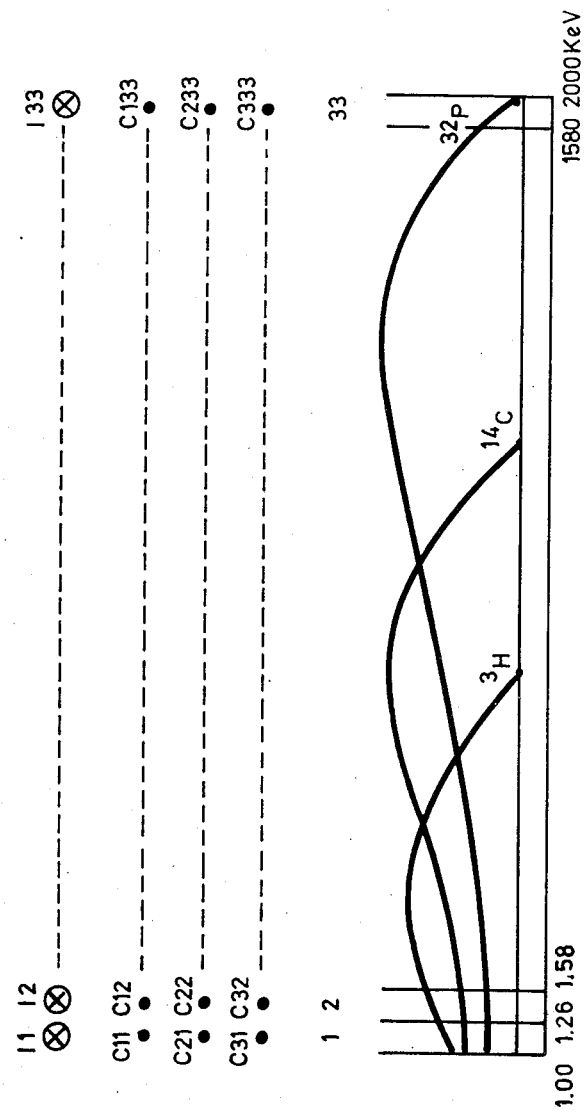

The invention will now be explained in detail, reference being made to the enclosed drawing in which:

FIG. 1 shows a schematic block diagram of an apparatus according to the invention FIG. 2 shows a portion of a matrix included in the apparatus, and FIG. 3 shows the part of the apparatus that is visible from the front panel of the instrument.

Referring now to FIG. 1 reference PM denotes the input of the apparatus, this input being connected to the photomultipler of the instrument. The input PM is connected to the input of a number of discriminators D1, D2 ... Dn. Each discriminator might for instance consist of a biased operational amplifier, having a certain threshold value, only signals having an amplitude exceeding this value giving rise to an output signal from the respective discriminator. These threshold values of the different discriminators should preferably be increasing in accordance with an exponentional function. The outputs of the discriminators are connected to one input of an end-circuit G1, G2 ..., Gn-1 respectively. The second inverting input of each end-circuit is connected to the discriminator having the next higher threshold level, an output signal thus being obtained from only one of the end-circuits when a pulse is supplied to the input of the apparatus. This output signal will thus indicate the highest threshold level exceeded by the pulse. The outputs of the end-circuits are connected via conductors R1, R2 ... Rn to suitable indicating devices I1, I2 ..., In, e.g., consisting of lamps. The light intensity of the lamps will thus give visible information about the spectral distribution of the output signals obtained from the photomultiplier. The apparatus of FIG. 1 further comprises three scalers Sc1, Sc2 and Sc3. The inputs of these scalers are connected to conductors Cm1, Cm2 and Cm3 perpendicular to the conductors R1 ... Rn connected to the outputs of the discriminators, the scaler conductors and the discriminator conductors intersecting each other at crossing points C11, C12, ... C1n, C21, C22, ... C2n and C31, C32, ... C3n respectively. At these crossings the conductors are connectable to each other as will be explained below. In each scaler one will thus obtain the sum of the number of pulses having an amplitude within the amplitude range of the amplitude channels connected to the conductor of the respective scaler.

FIG. 2 illustrates how the connections between the conductors R1 ... Rn and Cm1 – Cm3 could be carried out in practice. The conductors R1, R2, Rn and Cm1 – Cm3 respectively are arranged perpendicular to each other on opposite sides of an insulating plate P1. At each point of intersection C11 – C31, C12 – C32 there is a bore through the plate and the conductors. An electronic contact between the conductors can be provided by means such as a pin Kn comprising two sections of conducting material which are brought into contact with the respective conductors, the conducting sections being interconnected via a diode in order to prevent pulses on the parallel conductors to affect each other.

The function of the apparatus will now be explained in connection with FIG. 3.

In FIG. 3 which shows the part of the apparatus according to FIG. 1 visible from the front panel of the instrument, references I1, I2, . . . I33 denote the lamps having the corresponding references in FIG. 1. The apparatus is thus supposed to comprise 33 amplitude channels. Under the lamps there are three horizontal rows of holes, each hole corresponding to a crossing point of the matrix in FIG. 1 and having the same references as in FIG. 1. By inserting a plug or pin Kn, in a respective hole, the intersecting conductors are brought into electrical contact with each other. The front panel is further provided with a keV diagram, in which the limits of the respective amplitude channels are indicated. Thus for instance a pulse within channel 2 corresponds to a radiation energy of the radio active sample between 1.26 and 1.58 keV. Over the scale the approximate energy distributions for tritium, carbon 14 and phosphorus 32 are indicated. A sample comprising for instance the radioactive isotope phosphorus 32 will thus give rise to a light intensity spectrum of the lamps I1–I33 which approximately corresponds to the curve denoted $^{32}$P. By means of the lamps a visible indication of the spectral distribution of the sample is thus obtained and one can easily determine if the sample is normal or if there are reasons to suspect defects of the sample or the apparatus. From the indications of the lamps it is also easy to determine the upper threshold limit of the sample and it will not be necessary to make a time consuming sweep across the complete amplitude range as in the prior art designs. When the spectral distribution of the sample has been determined from the intensities of the lamps plugs are inserted in the holes corresponding to the amplitude interval of the amplitude range to be monitored, the sum of the number of pulses within this interval being counted in the scaler corresponding to the horizontal row where the plugs are inserted.

The reason why the apparatus is provided with three counters and three horizontal rows of holes is that certain specimens comprise more than one isotope, so called double labelled or triple labelled samples. The energy spectrum of the different isotopes of such samples could be approximately measured simultaneously by connecting the different scalers to different amplitude ranges and by making certain calculations of the sums obtained in the scalers.

We claim:

1. Apparatus for spectral analysis and counting of electrical pulses generated by radioactive disintergrations in a radiation measuring instrument, the apparatus comprising a number of discriminators, each discriminator transmitting signals within a specific preselected amplitude range, these amplitude ranges being located adjacent to each other, the inputs of the discriminators forming the input of the apparatus, a number of optical indication means, the outputs of the respective discriminators each being connected to one of said means, these means indicating the instantaneous spectral amplitude distribution of the pulses, the apparatus further comprising a number of scalers, connectable to a desired number of discriminator outputs, these outputs being chosed with respect to the indicated amplitude distribution, a number of conductors connected to the discriminators and scalers arranged to form rows and columns respectively in a matrix, the rows and columns being connectable at their intersecting points, and means to selectively connect a conductor of a discriminator with the conductor of a scaler at an intersection of a row and a column.

2. Apparatus according to claim 1, characterized in that the width of the specific amplitude ranges increases as the amplitudes within the ranges increase.

3. Apparatus according to claim 1, characterized in that the indicating means consist of lamps.

* * * * *